(12) United States Patent
Prentice et al.

(10) Patent No.: US 7,431,549 B1
(45) Date of Patent: Oct. 7, 2008

(54) TRACTOR TRAILER LOAD CARRYING APPARATUS

(76) Inventors: Derrick D. Prentice, 1300 Bayou Black Dr., Houma, LA (US) 70360; Manuel Collins, 145 W. 35th St., Cutoff, LA (US) 70345; Jamie Hoffpauir, 12J Cir., Houma, LA (US) 70360

( * ) Notice: Subject to any disclaimer, the term of this patent is extended or adjusted under 35 U.S.C. 154(b) by 273 days.

(21) Appl. No.: 11/351,297

(22) Filed: Feb. 8, 2006

Related U.S. Application Data

(60) Provisional application No. 60/652,050, filed on Feb. 10, 2005.

(51) Int. Cl.
*B60P 7/08* (2006.01)

(52) U.S. Cl. .......................... 410/115; 410/89; 410/106; 410/143

(58) Field of Classification Search .................... 410/89, 410/96, 97, 102, 106, 108, 110, 115, 116, 410/143, 144; 296/43; 224/402, 403, 322; 248/351, 499
See application file for complete search history.

(56) References Cited

U.S. PATENT DOCUMENTS 4,242,022 A * 12/1980 Fredrickson ................ 410/107

* cited by examiner

*Primary Examiner*—Stephen Gordon
(74) *Attorney, Agent, or Firm*—Garvey, Smith, Nehrbass & North, L.L.C.; Charles C. Garvey, Jr.

(57) ABSTRACT

The present invention discloses an improved trailer for use with a common tractor or truck, or like tow vehicle. The apparatus of the present invention features the use of a plurality of transversely positioned beams to keep secure a load, each having end portions with vertical sections that attach to receptacles provided on a bed portion of the tractor trailer. Fasteners are provided with each beam to secure a load that is to be carried by the trailer. Multiple of the beams can be attached at spaced apart positions for holding a load or load package therebetween.

23 Claims, 5 Drawing Sheets

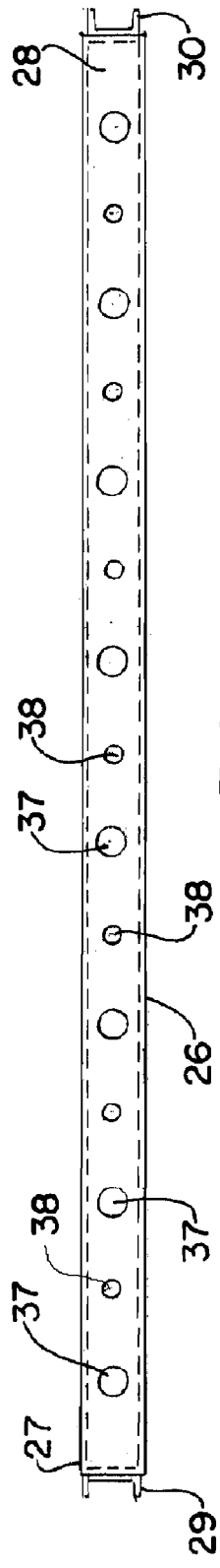
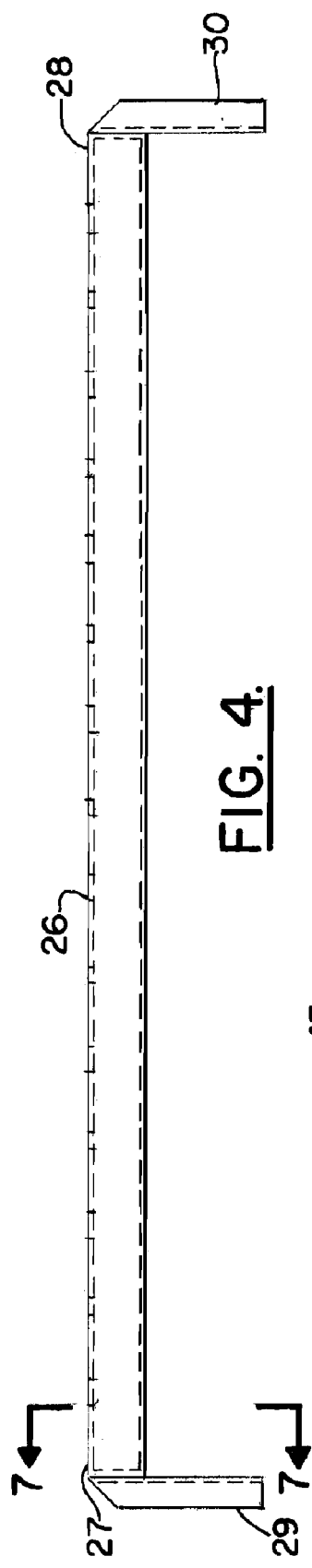
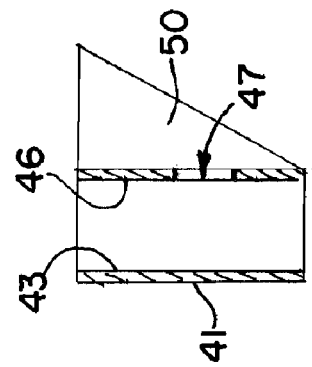

TRACTOR TRAILER LOAD CARRYING APPARATUS

CROSS-REFERENCE TO RELATED APPLICATIONS

Priority of U.S. Provisional Patent Application Ser. No. 60/652,050, filed Feb. 10, 2005, incorporated herein by reference, is hereby claimed.

STATEMENT REGARDING FEDERALLY SPONSORED RESEARCH OR DEVELOPMENT

Not applicable

REFERENCE TO A "MICROFICHE APPENDIX"

Not applicable

BACKGROUND OF THE INVENTION

1. Field of the Invention

The present invention relates to trailers that are a part of a tractor trailer vehicle arrangement, commonly referred to as "eighteen wheelers", and particularly to an improved trailer and load securing apparatus. Even more particularly, the present invention relates to an improved load carrying trailer apparatus, part of a tractor trailer rig wherein horizontally spaced apart vertical slotted portions are receptive of locking members that fit the slotted portions and that extend transversely across the load carrying bed portion of the trailer to help secure a carried load.

2. General Background of the Invention

Tractor trailer arrangements are used to carry various cargo items over long distances. The trailers of these devices can carry very heavy loads that must be secured to the load carrying bed of the trailer, and particularly must prevent forward or rear movement as can occur when the truck applies its brakes.

BRIEF SUMMARY OF THE INVENTION

A wheeled cargo trailer is disclosed herein. The apparatus provides a trailer having a chassis, front and rear end portions and a load carrying bed portion that includes a pair of spaced apart side rails and the bed providing surface that spans between the side rails.

Each of the rails supports a plurality of spaced apart receptacles. Each receptacle is comprised of preferably a plurality of side walls that surround a generally vertically oriented open ended bore.

One or more beams are preferably transversely positioned during use. The beams can be removably attached to the chassis at the receptacles. This attachment preferably includes anchoring a portion of the beam to a pair of opposed receptacles that are on opposing side rails of the bed.

Each beam has a horizontal section with end portions and a pair of spaced apart vertical sections. A vertical section is attached to an end portion of the horizontal section. Each vertical section is sized and shaped to fit a receptacle, wherein at least a part of the vertical section occupies the open ended bore.

Each beam can have multiple attachments for attaching elongated members (straps, ropes, wires, cables, etc.) to the beam at spaced apart positions. These attachments can include a winch and winch cable, eye bolts, eyelets, or the like as shown in FIGS. 13-19 of the drawings.

BRIEF DESCRIPTION OF THE SEVERAL VIEWS OF THE DRAWINGS

For a further understanding of the nature, objects, and advantages of the present invention, reference should be had to the following detailed description, read in conjunction with the following drawings, wherein like reference numerals denote like elements and wherein:

FIG. 3 is a fragmentary view of the preferred embodiment of the apparatus of the present invention;

FIG. 4 is another fragmentary view of the preferred embodiment of the apparatus of the present invention;

FIG. 5 is a fragmentary perspective view of the preferred embodiment of the apparatus of the present invention;

FIG. 6 is a sectional view of the preferred embodiment of the apparatus of the present invention taken along lines 6-6 of FIG. 5;

FIGS. 13-19 are partial perspective views of the preferred embodiment of the apparatus of the present invention illustrating various anchors to which a load can be attached using straps, chains, ropes or the like.

DETAILED DESCRIPTION OF THE INVENTION

Figure 1:
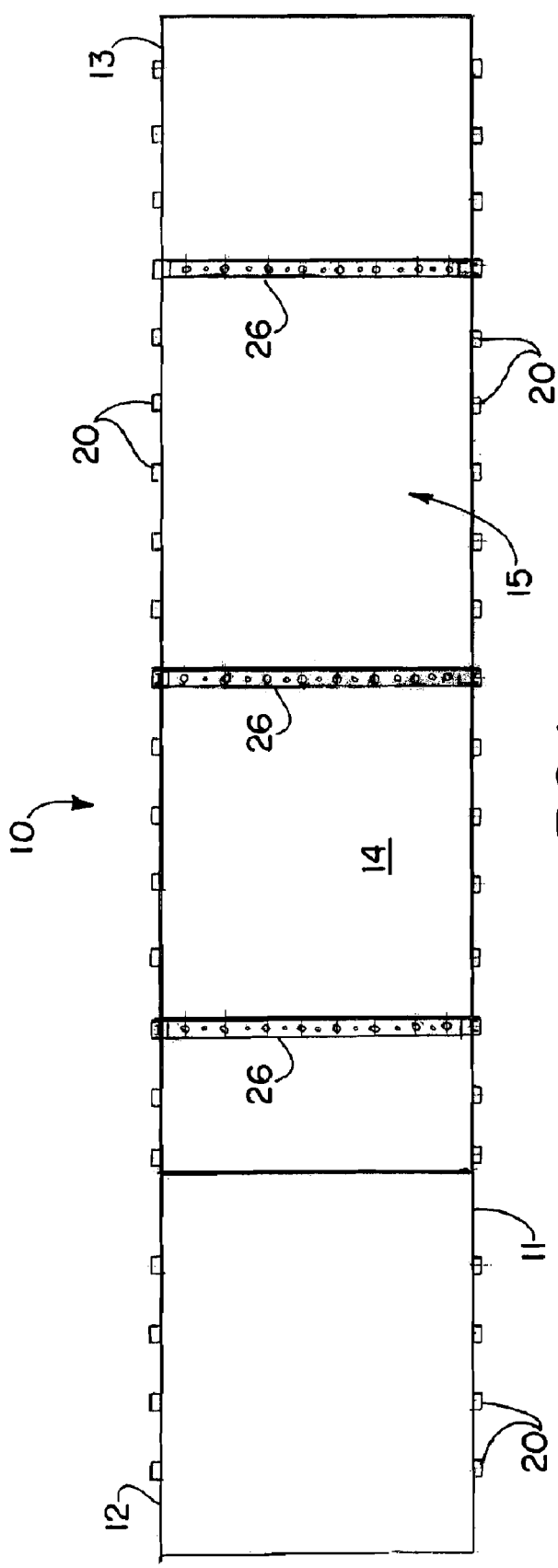
FIG. 1 is a partial plan view of the preferred embodiment of the apparatus of the present invention.

Trailer apparatus 10 provides an elongated chassis 11 having a front end portion 12 and a rear end portion 13. The chassis 11 includes a bed 14 having a load carrying surface 15. The bed 14 can be made of wood or wood and metal, for example. The rear end portion 13 of chassis 11 provides multiple wheels 16. The front end portion 12 of chassis 11 provides tongue 18 portion that can be attached to a tractor, truck or other powered tow vehicle that is configured to pull the trailer 10. Jack 17 can be used to support the trailer 10 when it is separated from the tractor or truck portion.

The chassis 11 provides a pair of spaced apart side rails 19. Spaced horizontally along each side rail 19 are a plurality of receptacles 20. The receptacles 20 each provide a vertical opening 21 that is open-ended. The receptacle 20 can be defined by a plurality of vertical flanges 22, 23, 24. The flanges 22 and 23 can be secured to side rail 19 using an attachment such as a welded attachment 25.

One or more horizontal beams 26 can be secured to chassis 11 as shown in FIGS. 1, 2, 8, 9. Each horizontal beam 26 has end portions 27, 28. A vertical beam 29, 30 is attached to each respective end portion 27, 28 of horizontal beam 26, as shown in FIGS. 3-4. Each vertical beam 29 can be comprised of a web 31 and a pair of spaced apart flanges 32.

Figures 7, 8:
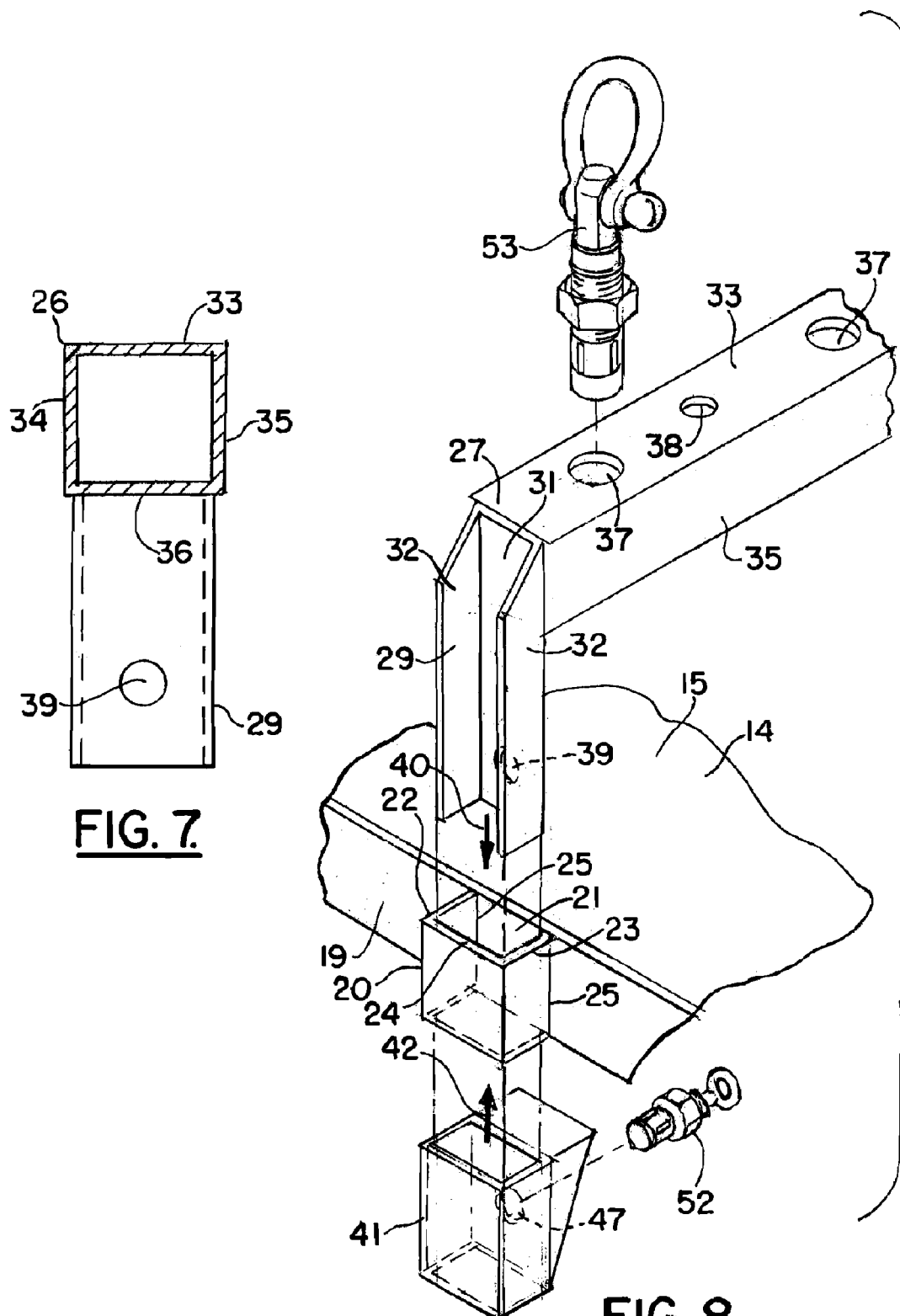
FIG. 7 is a sectional view taken along lines 7-7 of FIG. 4.
FIG. 8 is a partial perspective view of the preferred embodiment of the apparatus of the present invention.

Beam 26 can be a square tubing member comprised of a plurality of webs and flanges including horizontally extending spaced apart, generally parallel webs 33, 36 and vertical, parallel flanges 34, 35 as shown in FIG. 7.

A plurality of openings are provided in the upper most web 33, and spaced apart along the length of beam 26 as shown in FIG. 3. These openings include larger diameter openings 37 and smaller diameter openings 38.

In FIGS. 7-8, each of the vertical beams 29, 30 provides an opening 39 that is receptive of anchor bolt 52. In order to connect beam 26 to chassis 11 at load carrying surface 15, retainer 41 is connected to a beam 29, 30 after the beam 29, 30 passes through opening 21 of receptacle 20. In FIG. 8, arrow 40 schematically illustrates the downward movement of vertical beam 29 as it enters opening 21 and extends through receptacle 22.

Figure 9:
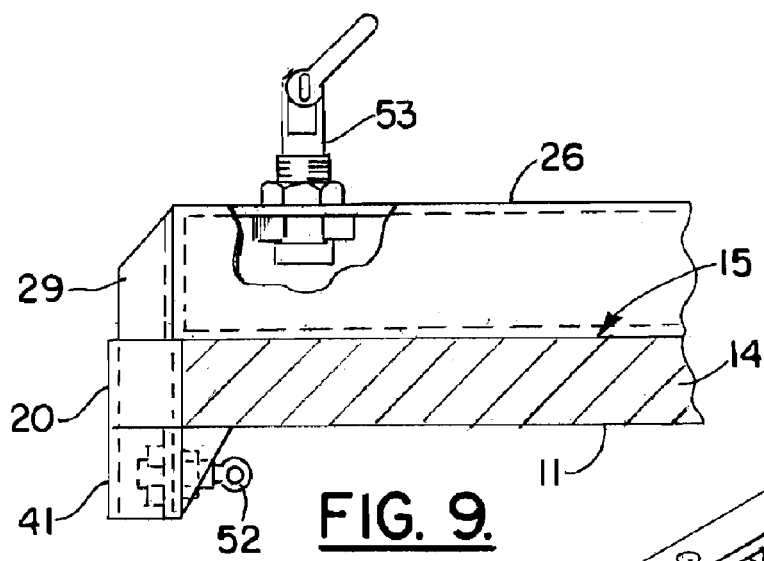
FIG. 9 is a partial sectional view of the preferred embodiment of the apparatus of the present invention.

In FIG. 8, arrow 42 schematically illustrates the upward movement of retainer 41 as it engages the lower end portion of beam 29 or 30 so that a connection can be formed therewith. The completed connection of beam 26 to bed 14 is shown in FIG. 9 wherein retainer 41 has been connected to beam 29 and secured with anchor bolt 52.

Retainer 41 in FIGS. 5, 6, and 8 includes a plurality of plate sections 43, 44, 45, 46 that can be generally square or rectangular in shape. Opening 47 is provided in plate section 46. Retainer 41 is reinforced using diagonal plate sections 49, 50 and transverse plate section 51 as shown in FIGS. 5 and 6.

Figure 2:
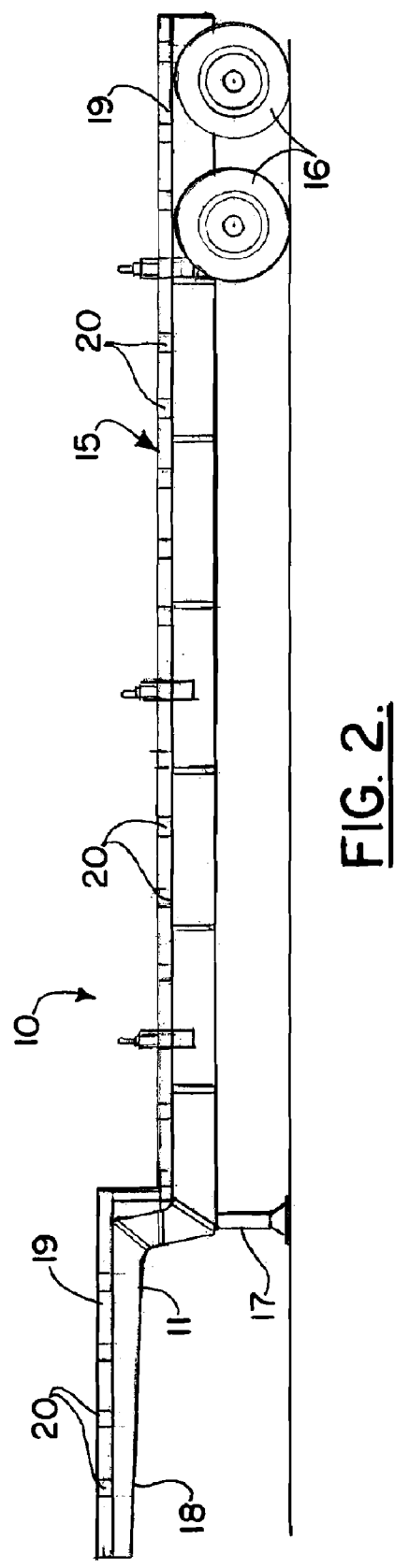
FIG. 2 is an elevation view of the preferred embodiment of the apparatus of the present invention.

The beam 26 secured to bed 14 is shown in FIGS. 1 and 2. Beams 26 can be placed at selected positions along the bed 14, such as for example in front of and behind a selected load or load module to be carried. Two of the beams 26 can thus prevent forward or rearward movement of the load being carried. In addition, the openings 37, 38 provide attachment points for attaching anchor bolts 53 or other anchoring devices to beam 26 as shown in FIGS. 8 and 9.

Figure 10:
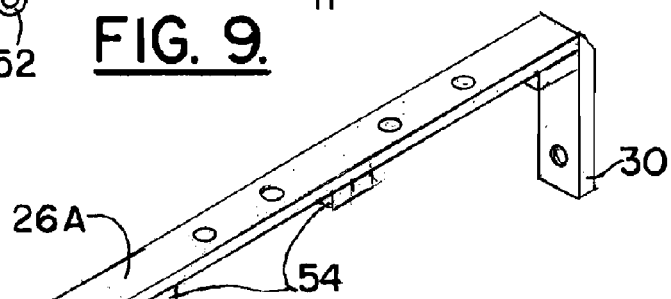
FIG. 10 is a partial perspective view of the preferred embodiment of the apparatus of the present invention.
Figure 11:
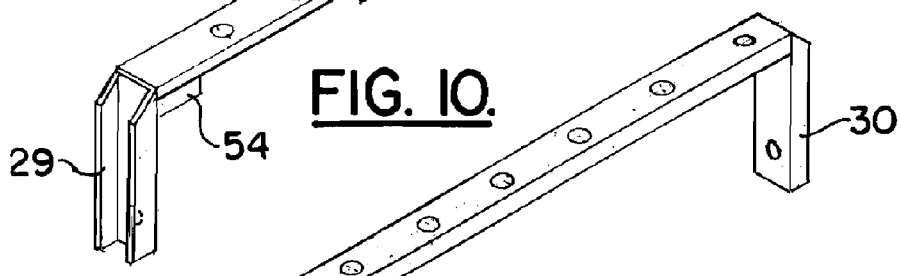
FIG. 11 is a partial perspective view of the preferred embodiment of the apparatus of the present invention.
Figure 12:
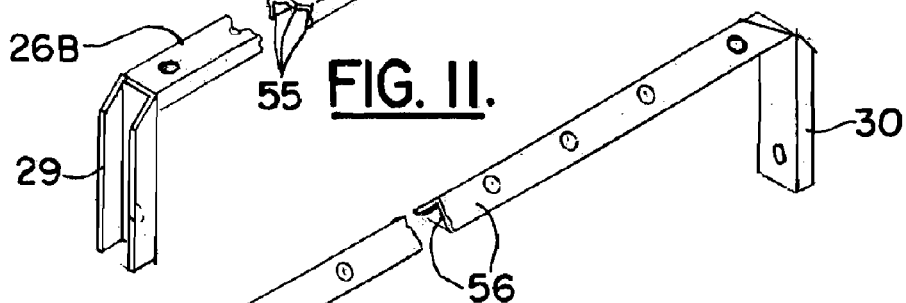
FIG. 12 is a partial perspective view of the preferred embodiment of the apparatus of the present invention.

FIGS. 10-12 show an alternate construction for the beam 26. In FIG. 10, beam 26A can be spaced above load carrying surface 15 using a plurality of spacer blocks 54.

In FIG. 11, the beam 26B is a flanged beam having a C or channel shape cross section 55.

In FIG. 12, the beam 26C has a triangular shape cross section.

Figure 13:
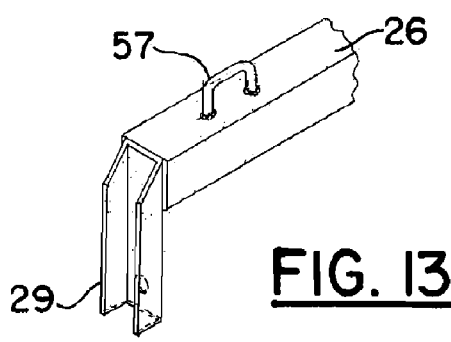

FIGS. 13-19 show various attachments that enable beam 26 to be fitted with a strap, cable, elongated tensile member or the like. In FIG. 13, a squared eyelet 57 is shown attached to beam 26 using welding, for example.

Figure 15:
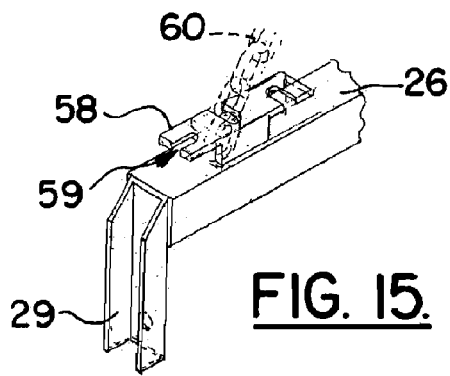

In FIG. 15, a plate 58 has a plurality of notches 59 that are receptive an end portion of chain 60. The chain 60 can be wrapped around or over a load to be transported, the ends of the chain 60 being attached to plates 58 on opposing end portions of beam 26 wherein the end portions of the chain 60 attach to a notch 59 of plate 58.

Figure 17:
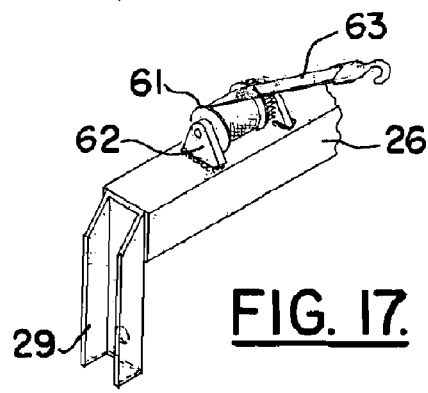

In FIG. 17, a winch 61 is attached to beam 26 using winch support 62. A winch strap 63 is wound upon the winch 61. The winch can be operated using a ratchet mechanism as is known.

Figure 19:
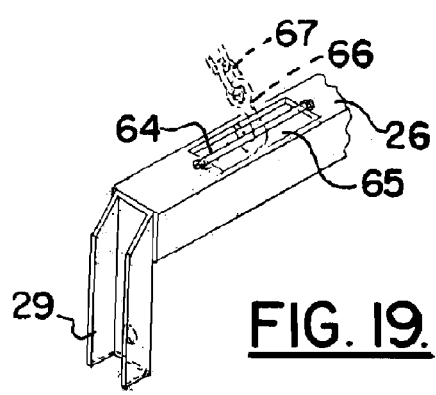

In FIG. 19, a bar 64 is welded to the upper surface of beam 26 and spans across opening 65. In this fashion, a hook 66 can be used to engage the bar 64, the hook being attached to an elongated chain 67.

Figure 14:
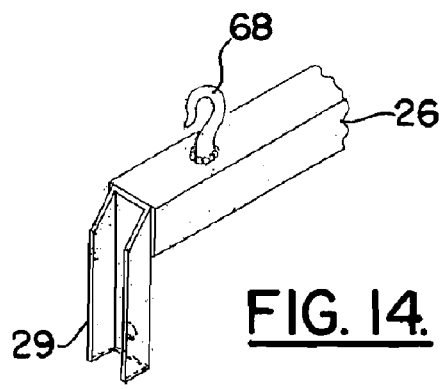

In FIG. 14, a hook 68 is attached (for example, welded) to the upper surface of beam 26 as shown.

Figure 16:
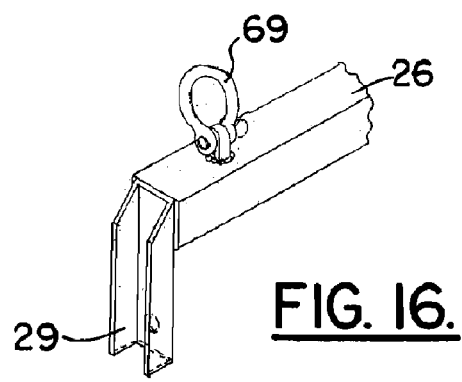

In FIG. 16, a shackle 69 is attached (for example, welded) to beam 26.

Figure 18:
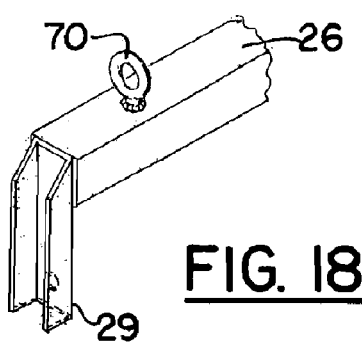

In FIG. 18, an eyelet or eye bolt 70 is attached to beam 26. The eyelet 70 can be any commercially available eyelet 70 that can be attached by bolting or welding to beam 26.

The following is a list of parts and materials suitable for use in the present invention.

| PARTS LIST | |
|---|---|
| Part Number | Description |
| 10 | trailer apparatus |
| 11 | chassis |
| 12 | front portion |
| 13 | rear portion |
| 14 | bed |
| 15 | load carrying surface |
| 16 | wheel |
| 17 | jack |
| 18 | tongue |
| 19 | side rail |
| 20 | receptacle |
| 21 | vertical opening |
| 22 | vertical flange |
| 23 | vertical flange |
| 24 | vertical flange |
| 25 | attachment |
| 26 | horizontal beam |
| 26A | horizontal beam |
| 26B | horizontal beam |
| 26C | horizontal beam |
| 27 | end portion |
| 28 | end portion |
| 29 | vertical beam |
| 30 | vertical beam |
| 31 | web |
| 32 | flange |
| 33 | web |
| 34 | flange |
| 35 | flange |
| 36 | web |
| 37 | larger diameter opening |
| 38 | smaller diameter opening |
| 39 | opening |
| 40 | arrow |
| 41 | retainer |
| 42 | arrow |
| 43 | plate section |
| 44 | plate section |
| 45 | plate section |
| 46 | plate section |
| 47 | opening |
| 49 | diagonal plate section |
| 50 | diagonal plate section |
| 51 | transverse plate section |
| 52 | anchor bolt |
| 53 | anchor bolt |
| 54 | spacer block |
| 55 | channel shape cross section |
| 56 | triangular shape cross section |
| 57 | eyelet |
| 58 | plate |
| 59 | chain notch |
| 60 | chain |
| 61 | winch |
| 62 | winch support |
| 63 | strap |
| 64 | bar |
| 65 | opening |
| 66 | hook |
| 67 | chain |
| 68 | hook |
| 69 | shackle |
| 70 | eye bolt |

All measurements disclosed herein are at standard temperature and pressure, at sea level on Earth, unless indicated otherwise. All materials used or intended to be used in a human being are biocompatible, unless indicated otherwise.

The foregoing embodiments are presented by way of example only; the scope of the present invention is to be limited only by the following claims.

The invention claimed is:

1. A wheeled cargo trailer, comprising:
   a) a trailer having a chassis, front and rear end portions, a load carrying bed portion that includes a pair of spaced apart side rails and a bed surface portion that spans between the side rails;
   b) each of the rails supporting a plurality of spaced apart receptacles, each receptacle comprised of a plurality of walls surrounding a generally vertically oriented open ended bore;
   c) one or more beams that can be removably attached to the chassis at the receptacles;
   d) each beam having a horizontal section with end portions and a pair of spaced apart vertical sections, each vertical section being sized and shaped to fit one of said receptacles wherein at least a part of the vertical section occupies the open ended bore of said one of said receptacles;
   e) each beam having multiple attachments for attaching elongated fasteners to the beam at spaced locations; and
   f) a fastener that secures each beam to the chassis at a position next to a respective one of said receptacles.

2. The wheeled cargo trailer of claim 1 wherein the fastener that secures each beam attaches to a vertical section.

3. The wheeled cargo trailer of claim 1 wherein each beam includes multiple flanges.

4. The wheeled cargo trailer of claim 1 wherein the beam horizontal section is a tubular beam section.

5. The wheeled cargo trailer of claim 1 wherein the beam vertical section is flanged.

6. The wheeled cargo trailer of claim 1 wherein the attachments include a cable.

7. The wheeled cargo trailer of claim 1 wherein the attachments include an eye bolt.

8. The wheeled cargo trailer of claim 1 wherein the attachments include a hook.

9. The wheeled cargo trailer of claim 1 wherein the attachments include a chain and chain anchor.

10. The wheeled cargo trailer of claim 1 wherein the attachments include a shackle.

11. The wheeled cargo trailer of claim 1 wherein the attachments include a winch and winch cable.

12. The wheeled cargo trailer of claim 1 wherein the attachments include an eyelet.

13. A wheeled cargo trailer, comprising:
    a) a trailer having a chassis having front and rear end portions, the chassis having a load carrying bed portion that includes a pair of spaced apart side rails and a bed surface portion that spans between the side rails;
    b) each of the rails supporting a plurality of spaced apart receptacles, each receptacle comprised of a wall surrounding a generally vertically oriented open ended bore;
    c) one or more beams that can be removably attached to the chassis at selected ones of the receptacles, wherein each beam attaches to a pair of said receptacles located on opposing sides of the chassis;
    d) each beam having a horizontal section with end portions and a pair of spaced apart vertical sections, each vertical section being sized and shaped to fit one of said receptacles wherein at least a part of the vertical section occupies the open ended bore of said one of said receptacles;
    e) each beam having multiple attachments for attaching elongated fasteners to the beam at spaced locations; and
    f) a fastener that secures each beam to the chassis at a position next to a respective one of said receptacles.

14. The wheeled cargo trailer of claim 13 wherein the fastener that secures each beam attaches to a vertical section.

15. The wheeled cargo trailer of claim 13 wherein each beam includes multiple flanges.

16. The wheeled cargo trailer of claim 13 wherein the beam horizontal section is a tubular beam section.

17. The wheeled cargo trailer of claim 13 wherein the beam vertical section is flanged.

18. The wheeled cargo trailer of claim 13 wherein the attachments include a cable.

19. The wheeled cargo trailer of claim 13 wherein the attachments include an eye bolt.

20. The wheeled cargo trailer of claim 13 wherein the attachments include a hook.

21. The wheeled cargo trailer of claim 13 wherein the attachments include a chain and chain anchor.

22. The wheeled cargo trailer of claim 13 wherein the attachments include a winch and winch cable.

23. The wheeled cargo trailer of claim 13 wherein the attachments include an eyelet.

* * * * *